United States Patent
Elser et al.

[11] 3,939,162
[45] Feb. 17, 1976

[54] ANTHRAPYRIMIDINE DYES

[75] Inventors: Wolfgang Elser, Frankenthal; Manfred Ruske, Ludwigshafen, both of Germany

[73] Assignee: BASF Aktiengesellschaft, Ludwigshafen (Rhine), Germany

[22] Filed: Dec. 19, 1973

[21] Appl. No.: 426,368

[30] Foreign Application Priority Data
Dec. 29, 1972 Germany............................ 2263919

[52] U.S. Cl. ... 260/256.4 Q; 260/240 G; 260/37 N; 260/42.21; 8/174; 8/39 B; 8/39 C; 8/39 D; 106/204
[51] Int. Cl.² ........................................ C07D 239/84
[58] Field of Search ........................... 260/256.4 Q

[56] References Cited
UNITED STATES PATENTS
2,697,097 12/1954 Ebel et al...................... 260/256.4 Q
2,871,240 1/1959 Randall et al................ 260/256.4 Q FOREIGN PATENTS OR APPLICATIONS
1,170,899 11/1969 United Kingdom........... 260/256.4 Q
1,367,834 7/1963 France........................ 260/256.4 Q Primary Examiner—Nicholas S. Rizzo
Assistant Examiner—David E. Wheeler

[57] ABSTRACT
Anthrapyrimidine dyes of the formula:

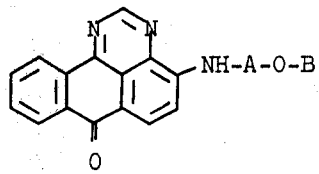

in which
  A is saturated alkylene of two to eight carbon atoms or cycloalkylene of six to eight carbon atoms; and
  B is hydrogen, or

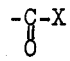

in which X is saturated alkyl of one to nine carbon atoms which may bear other substituents, phenalkyl, a five-membered or six-membered heterocyclic ring, —NHR or —OR in which R is alkyl of one to six carbon atoms, cycloalkyl of six to eight carbon atoms or unsubstituted or substituted phenyl. On synthetic fibers or in thermoplastics the dyes give yellow to orange colorations which have very good fastness properties.

7 Claims, No Drawings

ANTHRAPYRIMIDINE DYES

The invention relates to new anthrapyrimidine dyes of the formula (I):

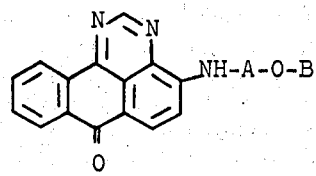

(I)

in which

A is linear or branched saturated alkylene of two to eight carbon atoms which may contain the bridging atom —O—, or cycloalkylene of six to eight carbon atoms; and B is hydrogen or

where X is linear or branched saturated alkyl of one to nine carbon atoms in which one or two hydrogen atoms may be replaced by chlorine, bromine or phenoxy; cycloalkyl of five to eight carbon atoms; phenyl in which one to three hydrogen atoms may be replaced by chlorine, bromine, fluorine, alkyl of one to three carbon atoms, trifluoromethyl, ethoxy, methoxy and/or cyano; naphthyl; phenalkyl of seven to ten carbon atoms; a five-membered or six-membered heterocyclic ring containing oxygen or nitrogen or both nitrogen and oxygen as heteroatoms; -NH-R or -O-R in which R is alkyl of one to six carbon atoms, cycloalkyl of six to eight carbon atoms or phenyl in which one to three hydrogen atoms may be replaced by chlorine, bromine, methyl, methoxy and/or phenoxy.

The new dyes are suitable, alone or mixed together or with other dyes, for dyeing and printing fibers of cellulose acetate, polyamides, polyurethanes and particularly for dyeing linear polyesters. The new dyes are also suitable for the mass coloration of thermoplastics such as polystyrene, polymethacrylates, polyethylene and polypropylene. The new dyes give bright yellow to golden yellow colorations on synthetic fibers and thermoplastics.

Alkylenes which may contain oxygen as a bridging atom and cycloalkylenes for A include the following specific examples: —CH$_2$—CH$_2$—, —CH$_2$—CH$_2$—CH$_2$—, —CH(CH$_3$)—CH$_2$—CH$_2$—, —CH(CH$_3$)—CH$_2$—, —CH$_2$—(CH(CH$_3$)—, —C(CH$_3$)$_2$—CH$_2$—, —C(CH$_3$)$_2$—CH$_2$—CH$_2$—, —CH$_2$—CH$_2$—O—CH$_2$—CH$_2$—,

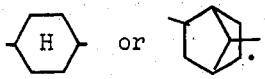

Of the said groups, alkylenes of the formulae —CH$_2$CH$_2$—, —CH$_2$CH$_2$CH$_2$—, —C(CH$_3$)$_2$—CH$_2$—, —CH$_2$—CH$_2$—O—CH$_2$—CH$_2$— and —CH(CH$_3$)—CH$_2$CH$_2$ are preferred for A.

Examples of linear or branched alkyls of one to nine carbon atoms which may bear chloro, bromo or phenoxy as substituents or cycloalkyls of five to eight carbon atoms for X are methyl, ethyl, propyl, isopropyl, n-butyl, sec.-butyl, chloromethyl, bromomethyl, dichloromethyl, β-chloroethyl, α-chloroethyl, vinyl (—CH=CH$_2$), heptyl-3, β-carbomethoxyethyl, β-carboethoxyethyl, β-carbobutoxyethyl, phenoxymethyl, cyclohexyl, methylcyclohexyl, cyclopentyl and cyclohexenyl.

Examples of phenyl in which one to three hydrogen atoms are replaced by chlorine, bromine, fluorine, alkyl of one to three carbon atoms, trifluoromethyl, methoxy, ethoxy and/or cyano (in addition to unsubstituted phenyl) for X are:

2-chlorophenyl, 3-chlorophenyl, 4-chlorophenyl, 2-methylphenyl, 3-methylphenyl, 4-methylphenyl, 3-trifluoromethylphenyl, 2-bromophenyl, 4-bromophenyl, 2,4-dichlorophenyl, 2,5-dichlorophenyl, 2-methoxyphenyl, 3-methoxyphenyl, 4-methoxyphenyl, 2-ethoxyphenyl, 4-ethoxyphenyl, 4-ethylphenyl, 4-isopropylphenyl, 4-n-propylphenyl, 4-cyanophenyl and 3-cyanophenyl.

Examples of phenylalkyl of seven to ten carbon atoms for X are: benzyl, phenylethyl and β-styryl; and examples of five-membered or six-membered heterocyclic rings are furyl-(2), pyridyl-3 and pyridyl-4.

For reasons of economy the following are preferred for X: 2-chlorophenyl, 3-chlorophenyl, 4-chlorophenyl, 2,4-dichlorophenyl, 3-trifluoromethylphenyl, 2-methylphenyl, 3-methylphenyl, 4-methylphenyl, 3-methoxyphenyl, 4-methoxyphenyl, cyclohexyl, phenoxymethyl, styryl, ethyl and n-propyl.

Phenyl, 2-chlorophenyl, 2,4-dichlorophenyl, 2,5-dichlorophenyl and cyclohexyl are particularly preferred substituents X for economical and tinctorial reasons.

Examples of alkyls of one to six carbon atoms and cycloalkyls of five to eight carbon atoms for R are: methyl, ethyl, n-propyl, isopropyl, sec.-butyl, n-butyl, n-hexyl, cyclohexyl, methylcyclohexyl, cyclopentyl and cyclooctyl.

Apart from phenyl itself, the following radicals are examples of phenyl in which one to three hydrogen atoms have been replaced by chlorine, bromine, methyl, methoxy or phenoxy for R: 2-chlorophenyl, 3-chlorophenyl, 4-chlorophenyl, 2-bromophenyl, 3-bromophenyl, 4-bromophenyl, 2-methylphenyl, 3-methylphenyl, 4-methylphenyl, 2-methoxyphenyl, 3-methoxyphenyl, 4-methoxyphenyl, 2,4-dichlorophenyl, 2,4,6-trichlorophenyl and 4-phenoxyphenyl.

4-chlorophenyl, phenyl, methyl and 2-propyl are preferred as radicals R in —NHR and —OR for the sake of economy.

The new dyes may be prepared by reaction of 1-(N), 9-(N-pyrimidino)-2-hydroxyanthraquinone with an aliphatic or cycloaliphatic aminoalcohol of the formula H$_2$N-A-OH followed if desired by treatment of the reaction product (formula (I) with B as hydrogen) with an acylating compound such as a carboxylic acid chloride, carboxylic acid anhydride or isocyanate.

Reaction of 1-(N), 9-(N-pyrimidino)-2-hydroxyanthraquinone (hereinafter referred to as 2-hydroxyanthraquinone derivative) is conveniently carried out in an excess of the amino alcohol and if desired in the presence of boric acid, the amino alcohol serving at the same time as a solvent. The reaction may also be carried out in a solvent which is inert under the reaction conditions such as glycol monomethyl ether, glycol monoethyl ether, glycol monobutyl ether, diglycol or propanediol-1,2 in the presence of at least the stoichiometric amount of the amino alcohol. It is advantageous however to use from 2 to 15 moles of the amino alcohol for each mole of 2-hydroxyanthraquinone derivative. The reaction temperature is generally from 90° to 170°C, if desired at the boiling temperature of the amino alcohol or the alcohol serving as solvent. The duration of the reaction depends on the amino alcohol and the reaction temperature. The reaction is generally ended after from two to eight hours under the said conditions.

Examples of amino alcohols of the formula $H_2N-A-OH$ are ethanolamine, propanolamine-1,3, 1-aminopropanol-2, 3-aminobutanol-1, 2-aminobutanol-1, 3-amino-3-methylbutanol-1,2-amino-2-methylpropanol-1, 2-(2'-hydroxyethoxy)-ethylamine-1, 4-aminocyclohexanol and hydroxynorbornylamine, preferably ethanolamine, 3-aminopropanol-1, 2-amino-2-methylpropanol-1 and 2-(2'-hydroxyethoxy)-ethylamine-1.

Dyes of formula (I) in which B is the radical —CO—X are obtained by reaction of 1-(N), 9-(N-pyrimidino)-2-hydroxyalkyl-(or cycloalkyl)-anthraquinones (II) with carboxylic acid chlorides, carboxylic anhydrides or isocyanates.

Depending on the acylating agent the reaction takes place at a temperature of from 0° to 100°C, in the presence or absence of an acid-binding agent and conveniently in an organic solvent which is inert under reaction conditions.

Examples of carboxylic acid chlorides which are suitable for the acylation are the chlorides of aliphatic fatty acids of one to nine carbon atoms which bear halogen such as chlorine or bromine in the alkyl, haloformic esters, cycloaliphatic carboxylic acid chlorides, aromatic carboxylic acid chlorides, araliphatic carboxylic acid chlorides and heterocyclic carboxylic acid chlorides. Specific examples are: acetyl chloride, propionyl chloride, butyryl chloride, 2-ethylhexanoic acid chloride, chloroacetyl chloride, dichloroacetyl chloride, acryloyl chloride, β-chloropropionyl chloride, methyl chloroformate, ethyl chloroformate, isopropyl chloroformate, cyclohexyl chloroformate, phenyl chloroformate, cyclohexanoic acid chloride, benzoyl chloride, 2-chlorobenzoyl chloride, 3-chlorobenzoyl chloride, 4-chlorobenzoyl chloride, 2-bromobenzoyl chloride, 3-bromobenzoyl chloride, 4-bromobenzoyl chloride, 2,4-dichlorobenzoyl chloride, 2,5-dichlorobenzoyl chloride, 2,4-dibromobenzoyl chloride, 2,4,5-trichlorobenzoyl chloride, 2-methylbenzoyl chloride, 3-methylbenzoyl chloride, 4-methylbenzoyl chloride, 2-ethylbenzoyl chloride, 3-ethylbenzoyl chloride, 4-ethylbenzoyl chloride, propylbenzoyl chloride, 3-trifluoromethylbenzoyl chloride, 2-methoxybenzoyl chloride, 3-methoxybenzoyl chloride, 4-methoxybenzoyl chloride, 2-ethoxybenzoyl chloride, 3-ethoxybenzoyl chloride, 4-ethoxybenzoyl chloride, 4-cyanobenzoyl chloride, 3-cyanobenzoyl chloride, cinnamyl chloride, phenylacetyl chloride, α-naphthoyl chloride, furyl-(2)-carboxylic acid chloride, nicotinyl chloride and pyridine-4-carboxylic acid chloride.

Cyclohexanoic acid chloride, benzoyl chloride, 2-chlorobenzoyl chloride, 2,5-dichlorobenzoyl chloride and 2,4-dichlorobenzoyl chloride are preferred from among the said acid chlorides.

Anhydrides of lower aliphatic carboxylic acids such as acetic anhydride and propionic anhydride are particularly suitable as anhydrides for the acylation.

Examples of suitable isocyanates are: methyl, ethyl, propyl, isopropyl, butyl, hexyl, allyl, phenyl, 4-chlorophenyl, α-naphthyl, methoxymethyl and γ-methoxypropyl isocyanates.

Reaction with the carboxylic acid halides or carboxylic anhydrides conveniently takes place in the presence of acid-binding agents, especially tertiary nitrogen bases such as pyridine, the picolines, the lepidines and aliphatic tertiary amines and also aliphatic-aromatic tertiary amines. Examples of tertiary amines apart from the pyridine bases already mentioned above are: trimethylamine, triethylamine, tripropylamine, tributylamine, N,N-dimethylaniline and N,N-diethylaniline. Acid-binding agents also include N,N-disubstituted carboxamides such as N,N-dimethylformamide, N,N-diethylformamide and N,N-diethylacetamide. Carbonates, hydrocarbonates or hydroxides of the alkali metals or of the alkaline earth metals and the alcoholates of the alkali metals are also suitable as acid-binding agents. Examples of such acid-binding agents are sodium carbonate, potassium carbonate, sodium hydrogen carbonate, potassium hydrogen carbonate, potassium hydroxide, sodium hydroxide and sodium methylate.

The said tertiary bases and amines or the N,N-disubstituted carboxylic acid amides such as pyridine, tripropylamine, N,N-diethylaniline or N,N-dimethylformamide may be used in excess as solvents.

The acylation is carred out as a rule in an organic solvent which is inert under the reaction conditions in the presence of at least a stoichiometric amount of a tertiary base or amine. Examples of suitable inert solvents are: aromatic hydrocarbons such as toluene, xylene, chlorobenzene, dichlorobenzene, trichlorobenzene or nitrobenzene or aliphatic chlorohydrocarbons such as chloroform, carbon tetrachloride or tetrachloroethane, and also lower aliphatic ketones such as acetone or cyclic ethers such as dioxane or tetrahydrofuran.

The new anthrapyrimidine dyes of the formula (I) are yellow to orange crystalline compounds which are sparingly soluble in water and which have melting points within the range from 100° to 250°C. Being disperse dyes, the new dyes are particularly suitable for dyeing polyethylene glycol terephthalate fibers by known and conventionally used methods from an aqueous liquor and give very bright yellow to orange shades. The dyeings have very good fastness to light, laundering, crocking, perspiration, sublimation and decatizing. When the new dyes are used for the mass coloration of thermoplastics such as polystyrene and copolymers of styrene, colorations having very good fastness to light are also obtained.

The following Examples will further illustrate the invention. The parts and percentages specified are by weight. The melting points are determined in a copper block. The temperature is uncorrected.

EXAMPLE 1

248 parts of 1-(N),9-(N-pyrimidino)-2-hydroxyanthraquinone is stirred in 700 parts of ethanolamine for 3 hours at 100° to 110°C under nitrogen. After cooling the yellow crystalline precipitate is filtered off, washed with methanol and dried. The yield is 239 parts of 1-(N),9-(N-pyrimidino)-2-β-hydroxyethylaminoanthraquinone having a melting point of 246° to 248°C.

Polyethylene glycol terephthalate fibrous material is dyed bright yellow hues from an aqueous dispersion.

EXAMPLE 2

An equal amount of propanolamine-1,3 is used instead of ethanolamine in Example 1 and the whole is heated for 1 hour at 150°C. 214 parts of 1-(N),9-(N-pyrimidino)-2-γ-hydroxypropylaminoanthraquinone is obtained with a melting point of 209° to 210°C. Bright golden yellow colorations having good daylight fastness are obtained from an aqueous liquor on polyethylene glycol terephthalate. fibrous material.

EXAMPLE 3

74.4 parts of 1-(N),9-(N-pyrimidino)-2-hydroxyanthraquinone is stirred with 105 parts of 2-(2-hydroxyethoxy)-ethylamine-1 in 105 parts of ethylene glycol monoethyl ether for 5 hours at 134°C. After cooling the crystalline precipitate is filtered off, washed with methanol and water and dried. 70 parts of 1-(N),9-(N-pyrimidino)-2-hydroxyethoxyethylaminoanthraquinone is obtained with a melting point of 173° to 175°C. The dye is equivalent in its tinctorial properties to the dye of Example 2.

EXAMPLE 4

24.8 parts of 1-(N),9-(N-pyrimidino)-2-hydroxyanthraquinone, 6 parts of boric acid and 70 parts of 2-amino-2-methylpropanol-1 are stirred for 8 hours at 142°C. The reaction mixture is cooled to 70°C, methanol is added and after cooling to room temperature the product is filtered off. The crystals of 1-(N),9-pyrimidino)-2-(2'-hydroxy-1',1'-dimethylethylamino)-anthraquinone obtained in a good yield have a melting point of 218° to 220°C and give very deep and bright yellow colorations on polyethylene glycol terephthalate fibers.

EXAMPLE 5

Example 4 is repeated using 70 parts of 1-aminopropanol-2 instead of 2-amino-2-methylpropanol-1 and the whole being stirred for 7 hours at 125° to 130°C. After cooling and filtration 22 parts of 1-(N),9-(N-pyrimidino)-2-(2'-hydroxypropionylamino)-anthraquinone is obtained with a melting point of 260° to 262°C.

EXAMPLE 6

The procedure of Example 4 is repeated but 50 parts of hydroxynorbornylamine is used instead of 2-amino-2-methylpropanol-1. After isolation a dye is obtained which dyes polyester fibers bright yellow hues.

EXAMPLE 7

42 parts of 1-(N),9-(N-pyrimidino)-2-β-hydroxyethylaminoanthraquinone (prepared according to Example 1) is stirred in 400 parts of chlorobenzene and 41 parts of tripropylamine with 75.3 parts of 2-chlorobenzoyl chloride at 60° to 80°C for 12 hours. After cooling the precipitate is filtered off and the residue is washed with chlorobenzene, methanol and water and dried. The yield is 53 parts of the dye of the formula:

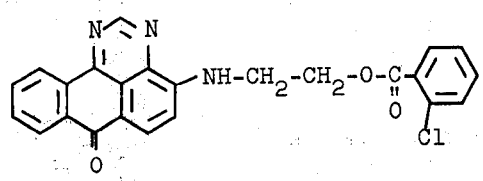

having a melting point of 210° to 211°C.

The finely dispersed dye dyes polyethylene glycol terephthalate fibers bright yellow hues having very good fastness to daylight, sublimation, laundering and crocking.

EXAMPLES 8 TO 17

1-(N),9-(N-pyrimidino)-2-β-hydroxyalkylamino anthraquinones which bear the alkylene radical indicated under A in Table 1 are reacted as described in Example 6 with acid chlorides $$B-C=O$$
$$|$$
$$Cl$$

in which B has the meanings given in Table 1.

Dyes of formula (I) in which A and B have the meanings indicated are obtained. The dyes give bright colorations having good fastness properties on polyethylene glycol terephthalate fibers.

TABLE 1

| Example | A | B | Hue on polyester | Melting point °C |
|---|---|---|---|---|
| 8 | —CH₂—CH₂— | -C(=O)-⟨H⟩ | golden yellow | 172 to 173 |
| 9 | —CH₂—CH₂— | -C(=O)-⟨⟩-Cl | yellow | 230 to 232 |
| 10 | —CH₂—CH₂— | -C(=O)-⟨Cl⟩-Cl | yellow | 199 to 200 |
| 11 | —CH₂—CH₂— | -C(=O)-⟨⟩-CH₃ | yellow | 266 to 227 |

TABLE 1-continued

| Example | A | B | Hue on polyester | Melting point °C |
|---|---|---|---|---|
| 12 | —CH$_2$—CH$_2$— | -C(=O)-C$_6$H$_4$-CF$_3$ | yellow | 201 to 202 |
| 13 | —CH$_2$—CH$_2$— | -C(=O)-CH$_2$-O-C$_6$H$_5$ | yellow | 159 to 160 |
| 14 | —CH$_2$—CH$_2$— | -C(=O)-C$_6$H$_4$-CH$_3$ | golden yellow | 184 to 185 |
| 15 | —CH$_2$—CH$_2$— | -C(=O)-C$_6$H$_5$ | yellow | 240 to 241 |
| 16 | —CH$_2$—CH$_2$— | -C(=O)-C$_6$H$_4$-CH$_3$ | yellow | 224 to 225 |
| 17 | —CH$_2$—CH$_2$—CH$_2$— | -C(=O)-C$_6$H$_5$ | golden yellow | 114 to 118 |

EXAMPLE 18

15.3 parts of 1-(N),9-(N-pyrimidino)-2-γ-hydroxy-propylaminoanthraquinone (prepared according to Example 2) is stirred in 50 parts of anhydrous nitrobenzene, 5.5 parts of dimethylformamide and 11.3 parts of o-toluyl chloride for 4 hours at 50° to 60°C. The reaction product is precipitated with methanol, and the precipitate is filtered off when cold and washed with methanol and water. The yield is 15 parts of the dye of the formula:

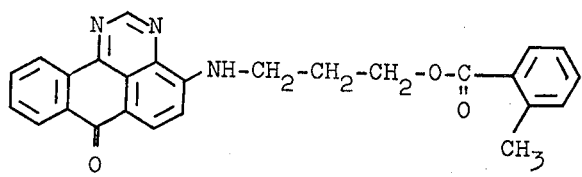

having a melting point of 178° to 180°C. Colorations on polyethylene glycol terephthalate fibers are bright yellow.

EXAMPLES 19 TO 28

As described in Example 18 anthraquinone derivatives of the formula (I) in which A has the meanings given in Table 2 and B is hydrogen are reacted with acid chlorides

in which B has the meanings given in table 2. Dyes of the formula (I) are obtained in which A and B have the meanings given in Table 2. The dyes dye polyesters in the hues indicated.

TABLE 2

| Example | A | B | Hue on polyester | Melting point °C |
|---|---|---|---|---|
| 19 | —CH$_2$—CH$_2$—O—CH$_2$—CH$_2$— | 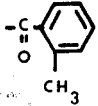 | all golden yellow | 197 to 199 |
| 20 | —CH$_2$—CH$_2$—O—CH$_2$—CH$_2$— |  | | 199 to 201 |
| 21 | —CH$_2$—CH$_2$—O—CH$_2$—CH$_2$— | 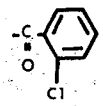 | | 196 to 198 |
| 22 | —CH$_2$—CH$_2$—CH$_2$— | 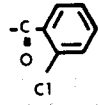 | | 169 to 172 |
| 23 | —CH$_2$—CH$_2$—CH$_2$— | 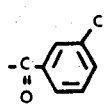 | | 177 to 179 |
| 24 | —CH$_2$—CH$_2$—CH$_2$— |  | | 178 to 180 |
| 25 | —CH$_2$—CH$_2$—CH$_2$— | 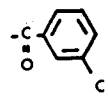 | | 136 to 138 |
| 26 | —CH$_2$—CH$_2$—CH$_2$ |  | | 172 to 174 |
| 27 | —CH$_2$—CH$_2$—O—CH$_2$—CH$_2$— | 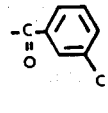 | | 107 to 109 |
| 28 | —CH$_2$—CH$_2$—O—CH$_2$—CH$_2$— | 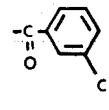 | | 189 to 190 |

EXAMPLE 29

21.7 parts of 1-(N),9-(N-pyrimidino)-2-β-hydroxyethylaminoanthraquinone is stirred in 100 parts of o-dichlorobenzene and 7 parts of dimethylformamide, 10 parts of tripropylamine and 24.5 parts of cinnamyl chloride for 5 hours at 60°C. The reaction product is precipitated in yellow crystals. After cooling it is filtered off and the residue is washed with methanol and water. The yield is 22 parts of the dye of the formula:

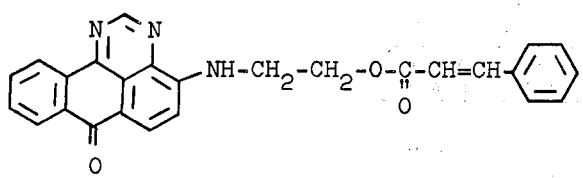

It has a melting point of 175° to 177°C. The dye dyes polyethylene glycol terephthalate golden yellow hues having good fastness properties.

EXAMPLES 30 TO 35

As described in Example 29 dyes of the formula (I) are prepared in which A and B have the meanings given in Table 3. All the dyes give yellow hues on polyesters.

parts of tripropylamine at 50° to 60°C has 17.8 parts of nicotinyl chloride added to it and the whole is stirred for 4 hours at 55° to 60°C and for one hour at 80°C. After cooling the mixture is suction filtered and the residue is washed with methanol. The yield is 18.5 parts of the dye of the formula:

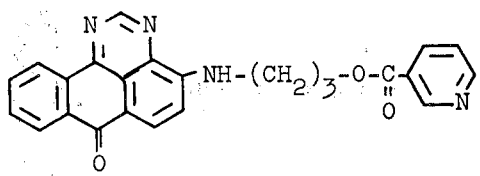

and having the melting point 203° to 205°C. Bright yellow colorations are obtained on polyethylene glycol terephthalate.

TABLE 3

| Example | A | B | Melting point °C |
|---|---|---|---|
| 30 | —CH₂—CH₂—CH₂— | -C(=O)-C₆H₄-OCH₃ | 168 to 170 |
| 31 | —CH₂—CH₂—CH₂— | -C(=O)-C₆H₄-OCH₃ (meta) | 132 to 134 |
| 32 | —CH₂—CH₂—CH₂— | -C(=O)-CH=CH-C₆H₅ | 158 to 160 |
| 33 | —CH₂—CH₂—CH₂— | -C(=O)-C₆H₃Cl₂ | 168 to 170 |
| 34 | —CH₂—CH₂—CH₂— | -C(=O)-CH₂-O-C₆H₅ | 172 to 174 |
| 35 | —CH₂—CH₂—O—CH₂—CH₂— | -C(=O)-C₆H₄-Cl | 194 to 196 |

EXAMPLE 36

15.3 parts of 1-(N),9-(N-pyrimidino)-2-γ-hydroxypropylaminoanthraquinone (prepared according to Example 2) in 95 parts of o-dichlorobenzene and 28.6

EXAMPLES 37 TO 38

Dyes of the formula (I) in which A and B have the meanings give in Table 4 are obtained as described in Example 36; both give yellow hues on polyesters.

TABLE 4

| Example | A | B | Melting point °C |
|---|---|---|---|
| 37 | —CH₂—CH₂— | 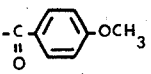 | 183 to 185 |
| 38 | —CH₂—CH₂— | 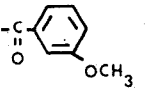 | 214 to 216 |

EXAMPLE 39

14.6 parts of 1-(N),9-(N-pyrimidino)-2-γ-hydroxy-propylaminoanthraquinone (prepared according to Example 2), 14.8 parts of tripropylamine, 70 parts of o-dichlorobenzene and 11.9 parts of phenyl isocyanate are stirred for 3 to 4 hours at 90°C. After the reaction mixture has been cooled the yellow crystals are filtered off and washed with methanol and water. The yield is 19 parts of the dye of the formula:

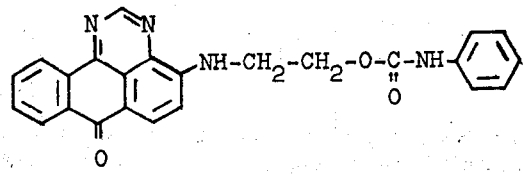

of the melting point 224°C to 226°C. Dyeings on polyethylene glycol terephthalate fibers have good fastness to daylight and sublimation.

EXAMPLES 40 TO 43

Dyes of the formula (I) in which A and B have the meanings give in Table 5 are obtained as described in Example 39.

pared according to Example 4) in 50 parts of pyridine has 8.4 parts of cyclohexanoic acid chloride added to it and the whole is stirred for four hours at 40°C. The reaction mixture is diluted with methanol and the precipitate is filtered off and washed with water. The yield is 11.5 parts of the dye of the formula:

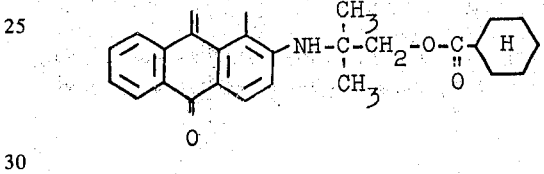

which has a melting point of 125° to 126°C. The dye dyes polyethylene glycol terephthalate fibers bright yellow hues having very good light fastness.

b. 5 parts of the dye obtained is incorporated in 10,000 parts of polystyrene in an extruder at about 190°C to 200°C. Colored granules are obtained which give bright transparent yellow moldings having good fastness to light in an injection molding machine at a temperature of from 190° to 220°C.

EXAMPLES 45 to 47

Dyes of the formula (I) in which A and B have the

TABLE 5

| Example | A | | Hue on polyester | Melting point °C |
|---|---|---|---|---|
| 40 | —CH₂—CH₂— | 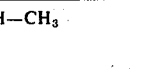 | golden yellow | 204 to 205 |
| 41 | —CH₂—CH₂— | 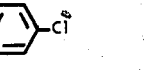 | yellow | 233 to 215 |
| 42 |  | | golden yellow | 195 to 197 |
| 43 |  | 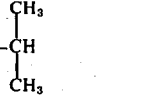 | yellow | 201 to 203 |

EXAMPLE 44 a. 9.6 parts of 1-(N),9-(N-pyrimidino)-2-(1', 1'-dimethyl-2'-hydroxyethylamino)-anthraquinone (premeanings give in Table 6 are obtained as described in Example 44(a).

TABLE 6

| Example | A | B | Hue on polyester | Melting point °C |
|---|---|---|---|---|
| 45 | —CH$_2$—CH$_2$—O—CH$_2$—CH$_2$— | —C(=O)—CH$_3$ | yellow | 139 to 141 |
| 46 | —CH$_2$—CH$_2$—O—CH$_2$—CH$_2$— | —C(=O)—CH$_2$—CH$_2$—CH$_3$ | yellow | 108 to 109 |
| 47 | —CH(CH$_3$)—CH$_2$—CH$_2$— | —C(=O)—(2-methylphenyl) | golden yellow | 138 to 140 |

EXAMPLE 48

15 parts of ethyl chloroformate is added at 0° to 5°C to 14.5 parts of 1-(N),9-(N-pyrimidino)-2β-hydroxyethylaminoanthraquinone in 150 parts of pyridine and the whole is stirred for 14 hours at 0° to 5°C. The reaction mixture is filtered and the residue is washed with methanol. 13.7 parts of a yellow powder of the formula:

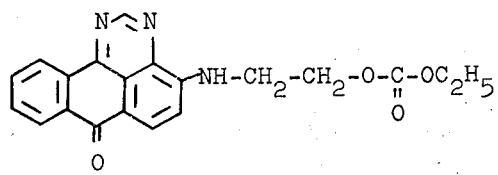

is obtained having a melting point of 162° to 164°C. Colorations on polyethylene glycol terephthalate fibers are bright yellow.

EXAMPLE 49

14.5 parts of 1-(N),9-(N-pyrimidino)-2-β-hydroxyethylamioanthraquinone is stirred in 70 parts of o-dichlorobenzene 14.8 parts of tripropylamine and 13 parts of propionic anhydride for 3 hours at 90°C. After cooling the residue is filtered off and washed with methanol and water. The yield is 15.6 parts of a yellow dye of the formula

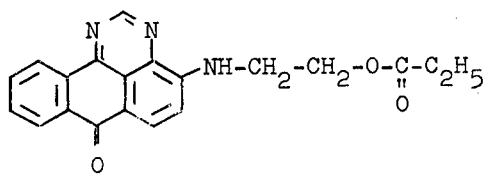

having a melting point of 159° to 161°C.

We claim:

1. An anthrapyrimidine dye of the formula

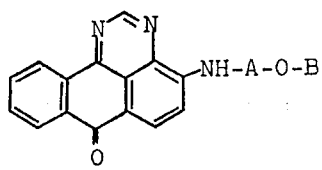

in which

A is linear or branched saturated unsubstituted alkylene of two to eight carbon atoms, or —CH$_2$—CH$_2$—O—CH$_2$—CH$_2$—;

B is hydrogen or

where X is linear or branched saturated alkyl of one to nine carbon atoms, a linear or branched saturated alkyl of one to nine carbon atoms in which one or two hydrogen atoms are substituted by chloro, bromo or phenoxy, cycloalkyl of five to eight carbon atoms, phenyl; phenyl in which one to three hydrogen atoms are substituted by chloro, bromo, fluoro, alkyl of one to three carbon atoms, trifluoromethyl, ethoxy and cyano, said phenyl substituents being identical or different, naphthyl, phenylalkyl of seven to ten carbon atoms, styryl, a pyridine ring, or —NH—R or —O—R where R is alkyl of one to six carbon atoms, cycloalkyl of six to eight carbon atoms, phenyl, or phenyl in which one to three hydrogen atoms are substituted by chloro, bromo, methyl, methoxy and phenoxy, said phenyl substituents being identical or different.

2. A dye of the formula according to claim 1 in which A is —CH$_2$—CH$_2$—, —CH$_2$—CH$_2$—CH$_2$—, —C(CH$_3$)$_2$—CH$_2$—, —CH(CH$_3$)—(CH$_2$)$_2$ or —CH$_2$—CH$_2$—O—CH$_2$—CH$_2$— and B has the meanings specified in claim 1.

3. An anthrapyrimidine dye of the formula

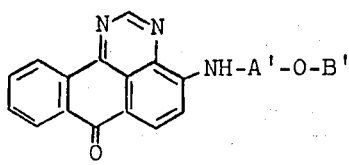

in which

A' is —CH$_2$—CH$_2$—; —CH$_2$—CH$_2$—CH$_2$—, —C(CH$_3$)$_2$—CH$_2$—, or —CH$_2$—CH$_2$—O—CH-

₂—CH₂— and
B' is

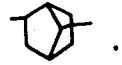

where X¹ denotes cyclohexyl, phenyl, 2-chlorophenyl, 3-chlorophenyl, 4-chlorophenyl, 2,4-dichlorophenyl, 3-trifluoromethyl-phenyl, 2-methylphenyl, 3-methylphenyl, 4-methylphenyl, 3-methoxyphenyl, 4-methoxyphenyl, phenoxymethyl, styryl, ethyl or propyl.

4. An anthrapyrimidine dye of the formula

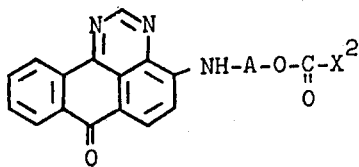

wherein A is —CH₂—CH₂—, —CH₂—CH₂—CH₂—, —C(CH₃)₂—CH₂— or —CH₂—CH₂—O—CH₂—CH₂—, and X² denotes cyclohexyl, phenyl, 2-chlorophenyl, 2,4-dichlorophenyl or 2,5-dichlorophenyl.

5. An anthrapyrimidine dye of the formula

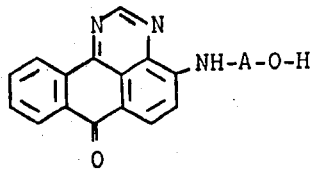

wherein A denotes —CH₂—CH₂—, —CH₂—CH₂—CH₂—, —C(CH₃)₂—CH₂—, —CH₂—CH₂O—CH₂—CH₂—, —CH₂—CH(CH₃)— or

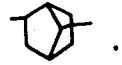

6. An anthrapyrimidine dye of the formula

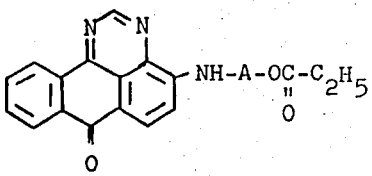

wherein A denotes —CH₂—CH₂— or —CH₂—CH₂—O—CH₂—CH₂—.

7. An anthrapyrimidine dye of the formula

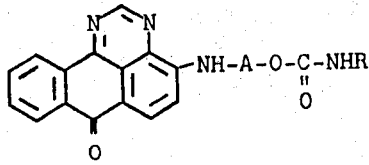

wherein A denotes —CH₂—CH₂— or —CH₂—CH₂—O—CH₂—CH₂ and R denotes phenyl, 4-chlorophenyl, methyl or 2-propyl.

* * * * *

UNITED STATES PATENT AND TRADEMARK OFFICE
CERTIFICATE OF CORRECTION

PATENT NO. : 3,939,162
DATED : February 17, 1976
INVENTOR(S) : Wolfgang Elser et al It is certified that error appears in the above–identified patent and that said Letters Patent are hereby corrected as shown below:

In Column 18, Claim 5, Line 4, delete " $-CH_2-CH_2O-CH_2-CH_2-,$ " and substitute -- $-CH_2-CH_2-O-CH_2-CH_2-,$ --

Signed and Sealed this

[SEAL]

Twenty-sixth Day of October 1976

Attest:

RUTH C. MASON
*Attesting Officer*

C. MARSHALL DANN
*Commissioner of Patents and Trademarks*